(12) United States Patent
Akita et al.

(10) Patent No.: US 7,697,498 B2
(45) Date of Patent: Apr. 13, 2010

(54) OFDM COMMUNICATION DEVICE

(75) Inventors: Hidenori Akita, Higashimurayama (JP); Tetsu Ikeda, Kawasaki (JP)

(73) Assignee: Motorola, Inc., Schaumburg, IL (US)

( * ) Notice: Subject to any disclaimer, the term of this patent is extended or adjusted under 35 U.S.C. 154(b) by 1163 days.

(21) Appl. No.: 10/541,951

(22) PCT Filed: Jan. 30, 2004

(86) PCT No.: PCT/US2004/002614
§ 371 (c)(1), (2), (4) Date: Jul. 12, 2005

(87) PCT Pub. No.: WO2004/070979
PCT Pub. Date: Aug. 19, 2004

(65) Prior Publication Data
US 2006/0050624 A1    Mar. 9, 2006

(30) Foreign Application Priority Data
Jan. 31, 2003    (JP) ............................. 2003-023163

(51) Int. Cl.
*H04J 1/00* (2006.01)
(52) U.S. Cl. .................. 370/343; 370/480; 375/296
(58) Field of Classification Search ............ 370/208, 370/343, 480; 375/296
See application file for complete search history.

(56) References Cited

U.S. PATENT DOCUMENTS

| | | | |
|---|---|---|---|
| 5,995,045 A * | 11/1999 | Georghiades et al. | 342/418 |
| 6,226,337 B1 * | 5/2001 | Klank et al. | 375/367 |
| 6,381,251 B1 | 4/2002 | Sano et al. | |
| 6,606,296 B1 * | 8/2003 | Kokkonen | 370/203 |
| 6,658,063 B1 | 12/2003 | Mizuguchi et al. | |
| 6,850,481 B2 * | 2/2005 | Wu et al. | 370/208 |
| 2001/0022810 A1 | 9/2001 | Joo | |
| 2002/0012421 A1 * | 1/2002 | Geile et al. | 379/56.2 |
| 2003/0086366 A1 * | 5/2003 | Branlund et al. | 370/208 |

(Continued)

FOREIGN PATENT DOCUMENTS

EP    0 553 841 A2    8/1993

(Continued)

OTHER PUBLICATIONS

Richard Van Nee et al., "OFDM for Wireless Multimedia Communications," Artech House Publishers, 2000, Section 4.6, pp. 86-88.

(Continued)

*Primary Examiner*—Kevin C Harper
*Assistant Examiner*—Sai-Ming Chan

(57) ABSTRACT

To provide high-quality communication even when the power for synchronization preamble is reduced in an OFDM communication device. To achieve symbol synchronization, an OFDM communication device obtains a zero amplitude reduced preamble signal by passing a specified synchronization preamble through an ideal low-pass filter to reduce a signal component near zero amplitude within a time domain, and time-multiplexes the obtained zero amplitude reduced preamble signal with transmit data to generate an OFDM transmit signal. A receiver section of the OFDM communication device determines the cross correlation between a receive signal and a specified synchronization preamble, which is patterned the same as the counterpart in a transmitter section of the OFDM communication device, and detects a synchronization position in accordance with the determined cross correlation.

18 Claims, 4 Drawing Sheets

U.S. PATENT DOCUMENTS

2004/0082298 A1* 4/2004 Chen .......................... 455/98
2004/0120409 A1* 6/2004 Yasotharan et al. ......... 375/260

FOREIGN PATENT DOCUMENTS

EP 0 683 576 A1 11/1995

OTHER PUBLICATIONS

Betsy L. Deppe, "PCT/US2004/002614—PCT International Search Report and Written Opinion," WIPO, ISA/US, Commisioner for Patents, Alexandria, VA, USA, Aug. 19, 2004.

Athina Nickitas-Etienne, "PCT/US2004/002614—PCT International Preliminary Report on Patentability," The International Bureau of WIPO, Geneva, Switzerland, Aug. 5, 2005.

Japan Examiner, "Ist Japanese Office Action," Japanese Patent Office, Aug. 5, 2008.

Secretary Of Ministry Of Economy, Trade And Industry, "Japanese Notice of Allowance," Japanese Patent Office, Mar. 13, 2009.

Mei Feng, "Supplementary European Search Report," European Patent Office, Berlin, Germany, Nov. 6, 2009.

* cited by examiner

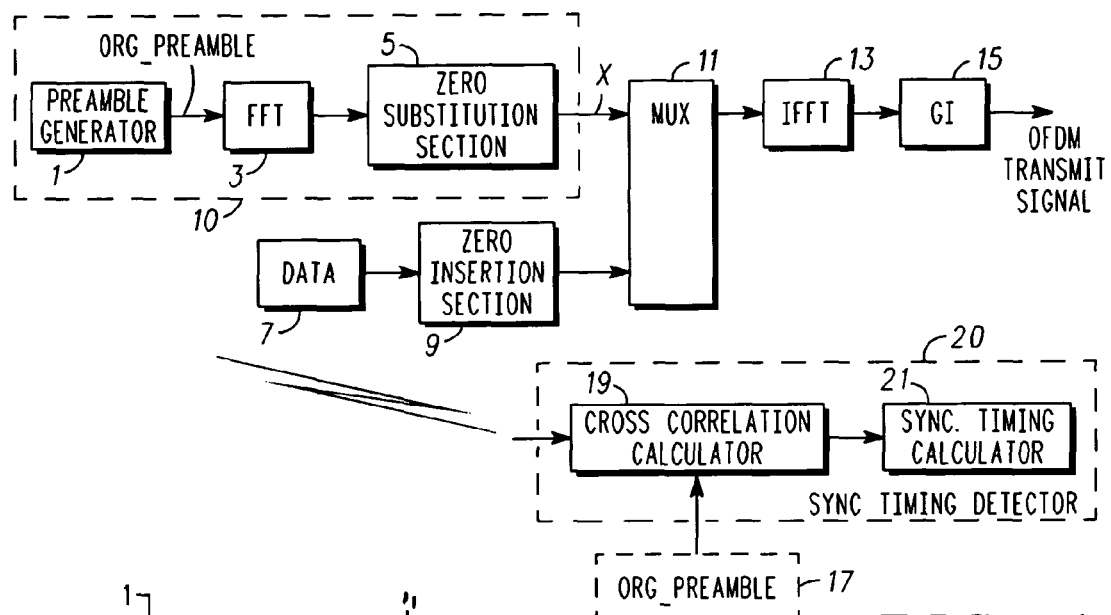
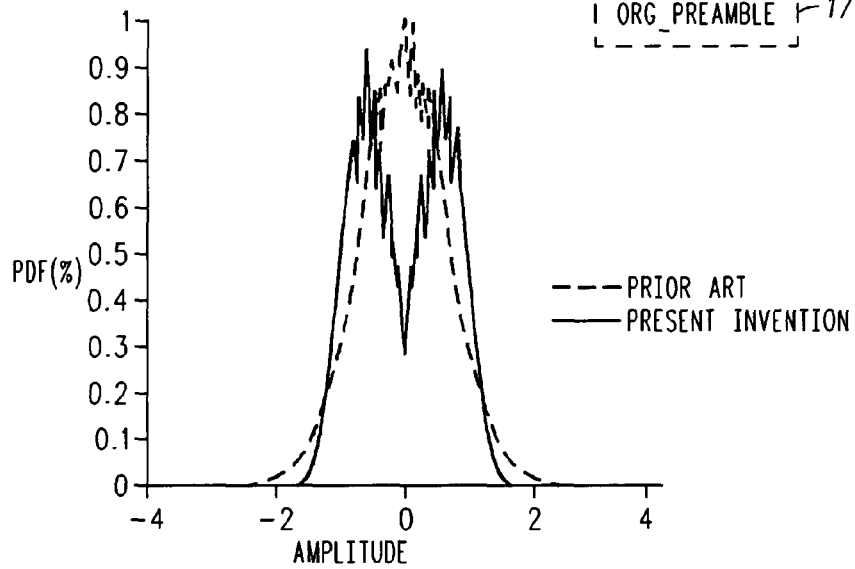
FIG. 2
FIG. 3
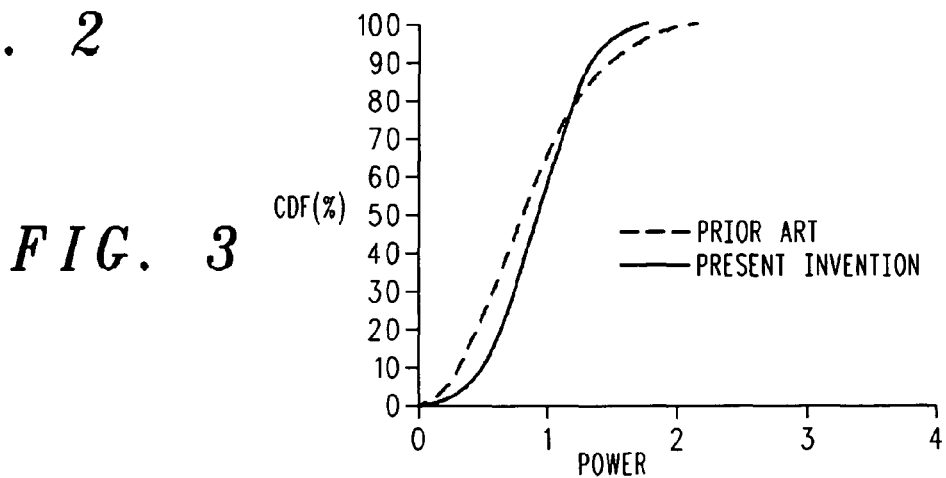
FIG. 1

| BANDWIDTH | 101.25 MHz |
|---|---|
| NUMBER OF SUBCARRIERS | 768 |
| NUMBER OF IFFT/FFT POINTS | 1024 |
| OFDM SYMBOL PERIOD (EFFECTIVE DATA PLUS GI) | 9.259uS (1024 SAMPLES+226 SAMPLES) (7.585uS + 1.674 uS) |
| FRAME LENGTH | 55 OFDM SYMBOLS (52DTCH, 2PICH, 1SCH) |
| MODULATION | QPSK |
| CHANNEL MODEL | SEE FIG.7 |
| OTHER CELL INTERFERENCE | GAUSS DISTRIBUTION (CNR=12dB) |
| CHANNEL ESTIMATION | PILOT SYMBOL ASSISTED ESTIMATION |
| SCH/DTCH | 0, -2, -4, -6, -8, -10dB |

| PATH NUMBER | DELAY (nS) | GAIN (dB) |
|---|---|---|
| 1 | 0.000 | 0.000 |
| 2 | 148.145 | -1.000 |
| 3 | 296.289 | -2.000 |
| 4 | 444.436 | -3.000 |
| 5 | 592.578 | -4.000 |
| 6 | 740.723 | -5.000 |
| 7 | 888.867 | -6.000 |
| 8 | 1037.012 | -7.000 |
| 9 | 1185.156 | -8.000 |
| 10 | 1333.301 | -9.000 |
| 11 | 1481.445 | -10.000 |
| 12 | 1629.590 | -11.000 |

OFDM COMMUNICATION DEVICE

The present invention relates to a symbol synchronization method for use in an orthogonal frequency division multiplexing (OFDM) communication device, and more particularly to a technology that is used in an OFDM communication device, which uses a synchronization preamble to achieve symbol synchronization between a transmitter and a receiver, for the purpose of preventing the communication characteristics from deteriorating even when the synchronization preamble power is reduced.

FIG. 9 schematically shows the configuration of a prior art OFDM communication device that uses a synchronization preamble to achieve symbol synchronization for OFDM communication. The transmitter section of the communication device shown in the figure comprises a preamble generator 91, a data supplier 93, a time multiplexer 95, a zero insertion section 97, an inverse fast Fourier transform (IFFT) section 99, and a guard interval (GI) insertion section 101.

The receiver section of the communication device shown in the figure comprises a time domain preamble (tx_preamble) supply section, which includes a preamble generator 91a, a zero insertion section 97a, an IFFT section 99a, and a GI insertion section 101a, and a synchronization timing detector 107. The synchronization timing detector 107 comprises a cross-correlation calculator 103 and a synchronization timing calculator 105.

In the configuration described above, the time multiplexer (MUX) 95 in the transmitter section time-multiplexes preamble data, which is supplied from the preamble generator 91 in a specified pattern, and transmit data, which is supplied from the data supplier 93. The zero insertion section 97 subjects the time-multiplexed data to a zero insertion process (filling with zeros) for the purpose of avoiding interference from an external signal. The resulting data is then inverse fast Fourier transformed in the IFFT section 99. Next, the GI insertion section 101 adds a guard interval (GI) to the transformed data in order to suppress multipath interference. A transmit OFDM signal comprising an OFDM symbol, which comprises the guard interval and information, is then generated.

The receiver section generates a time domain synchronization preamble (tx_preamble) in the same pattern as the transmitter section. This synchronization preamble is generated by the preamble generator 91a, zero insertion section 97a, IFFT section 99a, and GI insertion section 101a. For the time domain synchronization preamble (tx_preamble), the cross-correlation calculator 103 calculates the cross correlation with a receive signal transmitted from the transmitter section. The synchronization timing calculator 105 determines a position that is shifted from a peak value position by a specified amount of time and generates synchronization timing data. Symbol synchronization can then be achieved between the transmitter and receiver sections of the OFDM communication device.

However, the synchronization preamble (tx_preamble) used to determine the cross correlation in the receiver section requires a large number of bits because it has a Gauss distribution and wide dynamic range. Thus, the volume of calculations performed in the cross-correlation calculator 103 is huge. It is therefore proposed that the volume of calculations performed in the cross-correlation calculator 103 be reduced by quantizing the time domain synchronization preamble to one bit as a synchronization preamble (Taira, et al., "OFDM Communication System Timing Synchronization Method for Frequency-Selective Fading Environment," Journal B of The Institute of Electronics, Information and Communication Engineers, Vol. J84-B, No. 7, pp. 1255-1264, July 2001).

As described above, the calculations performed by a prior art to determine the cross correlation between a time domain synchronization preamble and receive signal are large in volume and not practical because the amplitude distributions of both signals are Gauss distributions having an average value of 0. It is therefore proposed that the synchronization preamble be used after being quantized to one bit. It is also preferred that the power for synchronization preamble transmission be minimized in the OFDM communication device for the purpose of reducing the time required for cross correlation calculations and the interference with synchronization preamble data. However, if the power for synchronization preamble transmission is reduced in a situation where the synchronization preamble is used after being quantized to one bit as described above, the bit error rate (BER) and other communication characteristics deteriorate.

SUMMARY OF THE INVENTION

The present invention has been made in view of the above prior art problems and provides a method for achieving symbol synchronization in an OFDM communication device while reducing the degree of characteristics deterioration even when the power for synchronization preamble transmission is reduced.

One aspect of the present invention provides a transmitter for use in an OFDM communication device, which uses a synchronization preamble to achieve synchronization between the transmitter and receiver. The transmitter obtains a zero amplitude reduced preamble signal by passing a specified synchronization preamble through an ideal low-pass filter to reduce a signal component near zero amplitude within a time domain, and time-multiplexes the obtained zero amplitude reduced preamble signal with transmit data to generate an OFDM transmit signal.

In the above instance, it is convenient that the ideal low-pass filter comprise an FFT section for subjecting an input signal to fast Fourier transform (FFT) and a zero substitution section for providing zero substitution for FFT section output components having a frequency higher than specified.

Further, the ideal low-pass filter may comprise a table that stores values obtained when input signals pass through the ideal low-pass filter in accordance with the values of the input signals.

It is also convenient that the ideal low-pass filter comprise a table that stores values obtained when input signals pass through the ideal low-pass filter in accordance with the values of the input signals.

Another aspect of the present invention provides a receiver in the OFDM communication device for use with the transmitter. The receiver a synchronization timing detector for determining the cross correlation between a receive signal and a specified synchronization preamble, which is patterned the same as the counterpart in the transmitter section, and detecting a synchronization position in accordance with the determined cross correlation.

In the above instance, it is convenient that the synchronization position be shifted from a peak position of the cross correlation by a specified amount of time.

Still another aspect of the present invention provides an OFDM communication device that uses a synchronization preamble to achieve synchronization between a transmitter and a receiver. The OFDM communication device comprises a transmitter for obtaining a zero amplitude reduced preamble signal by passing a specified synchronization preamble through an ideal low-pass filter to reduce a signal component near zero amplitude within a time domain, and generating an OFDM transmit signal by time-multiplexing the obtained zero amplitude reduced preamble signal with transmit data and a receiver having a synchronization timing detector for determining the cross correlation between a receive signal and a specified synchronization preamble, which is patterned the same as the counterpart in the transmitter section, and detecting a synchronization position in accordance with the determined cross correlation.

In the above instance, it is convenient that the ideal low-pass filter comprise an FFT section for subjecting an input signal to fast Fourier transform (FFT) and a zero substitution section for providing zero substitution for FFT section output components having a frequency higher than specified.

Further, the ideal low-pass filter may comprise a table that stores values obtained when input signals pass through the ideal low-pass filter in accordance with the values of the input signals.

It is also convenient that the synchronization position be shifted from a peak position of the cross correlation within the receiver by a specified amount of time.

BRIEF DESCRIPTION OF THE DRAWINGS

FIG. 1 is a block diagram that schematically shows the configuration of one embodiment of an OFDM communication device according to the present invention.

FIG. 2 is a graph that compares the amplitude-vs.-PDF characteristic of a zero amplitude reduced preamble according to the present invention against that of a prior art.

FIG. 3 is a graph that compares the power-vs.-CDF characteristic of synchronization preamble use according to the present invention against that of a prior art.

DETAILED DESCRIPTION OF THE PREFERRED EMBODIMENTS

Figure 4:
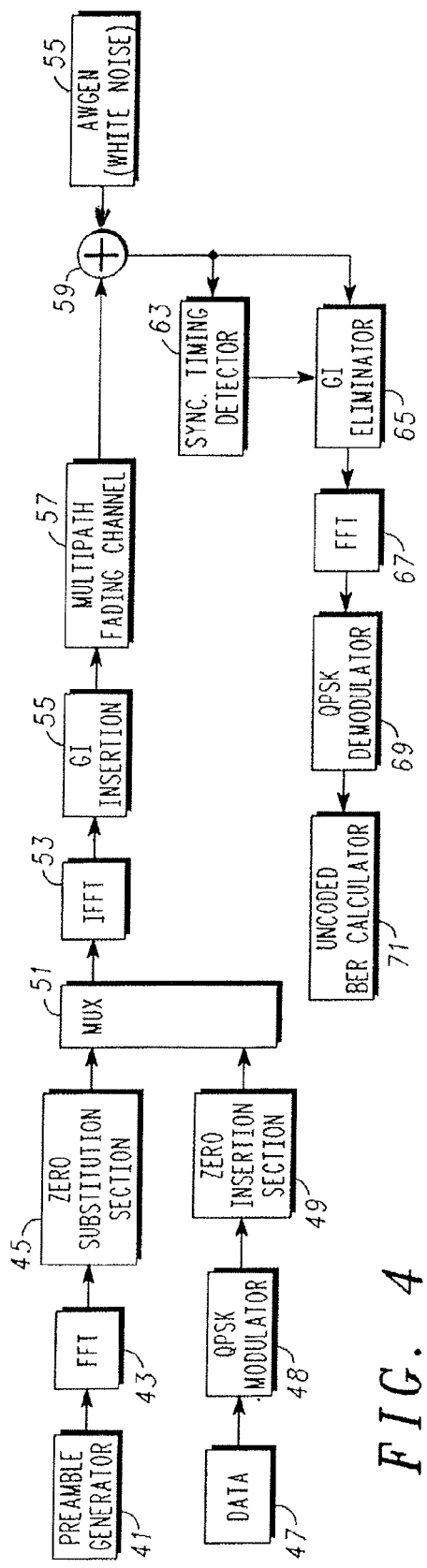
FIG. 4 is a block diagram that illustrates a simulation model for performance evaluation of the present invention.

Preferred embodiments of the present invention will now be described with reference to the accompanying drawings. FIG. 1 schematically shows the configuration of one embodiment of an OFDM communication device according to the present invention. The transmitter section of the communication device shown in the figure comprises a synchronization signal generator 10, a data supplier 7, a zero insertion section 9, a time multiplexer (MUX) 11, an inverse fast Fourier transform (IFFT) section 13, and a guard interval (GI) insertion section 15. The synchronization signal generator 10 includes a preamble generator 1, a fast Fourier transform (FFT) section 3, and a zero substitution section 5.

The receiver section of the communication device comprises a synchronization timing detector 20, which includes a cross-correlation calculator 19 and a synchronization timing calculator 21, and a preamble supplier 17, which generates a synchronization preamble (org_preamble) that is patterned the same as the counterpart generated from the preamble generator 1 in the transmitter section.

In the transmitter section of the OFDM communication device shown in FIG. 1, the synchronization signal generator 10 generates a zero amplitude reduced preamble signal. In other words, the original preamble signal (org_preamble) for a specified pattern supplied from the preamble generator 1 is supplied to an ideal low-pass filter (ideal LPF), which comprises the FFT section 3 and zero substitution section 5. The ideal LPF is implemented when the original preamble signal is fast Fourier transformed in the FFT section 3 and then components having higher frequencies than those in a specified pass band are subjected to zero substitution. More particularly, the ideal LPF is implemented by subjecting frequency components having frequencies higher than specified to zero substitution.

Practically, the ideal LPF may comprise a table that stores values obtained when input signals pass through the ideal low-pass filter in accordance with the values of the input signals. When such a table is employed and configured to obtain an output signal in response to an input signal, an ideal LPF having a simple structure and a high response speed can be implemented.

The zero amplitude reduced preamble signal X, which is obtained as described above, is supplied to the time multiplexer 11. The transmit data fed from the data supplier 7 is subjected to zero insertion in the zero insertion section 9 as is the case with the aforementioned prior art, supplied to the time multiplexer 11, and time-multiplexed with the above zero amplitude reduced preamble signal X. The resulting time-multiplexed signal is inverse fast Fourier transformed in the IFFT section 13. Further, the GI insertion section 15 inserts a guard interval into the resulting signal. This produces a transmit OFDM signal.

The receiver section acquires a receive signal by receiving the transmit OFDM signal, which is obtained in a manner described above, via a desired communication channel. In the cross-correlation calculator 19, this receive signal calculates the cross correlation with a 1-bit synchronization preamble (org_preamble) that is prevalent before passage through the ideal LPF in the transmitter section. The resulting cross correlation value has a peak value for a specified timing part. The synchronization timing calculator 21 calculates a synchronization position, which is shifted from the peak value position by a specified amount of time. Symbol synchronization is then achieved between the transmitter and receiver sections.

FIG. 2 compares the amplitude-vs.-PDF characteristics of the zero amplitude reduced preamble signal, which is used with the OFDM communication device according to the present invention, and the synchronization preamble signal, which is used with the prior art. The term "PDF" is an acronym for probability density function. As is obvious from FIG. 2, the amount of near-zero signal component of the synchronization preamble according to the present invention is smaller than that of the prior art. It can therefore be estimated that the probability of significant deterioration in the instantaneous carrier-to-noise ratio (CNR) would decrease. Thus, it is possible to reduce the power required for synchronization preamble transmission.

FIG. 3 compares the power-vs.-CDF (cumulative distribution function) characteristics of the zero amplitude reduced preamble signal according to the present invention and the prior art synchronization preamble signal. It can be seen from the figure that a low-power portion of the synchronization preamble according to the present invention is reduced in terms of distribution.

Figure 5:
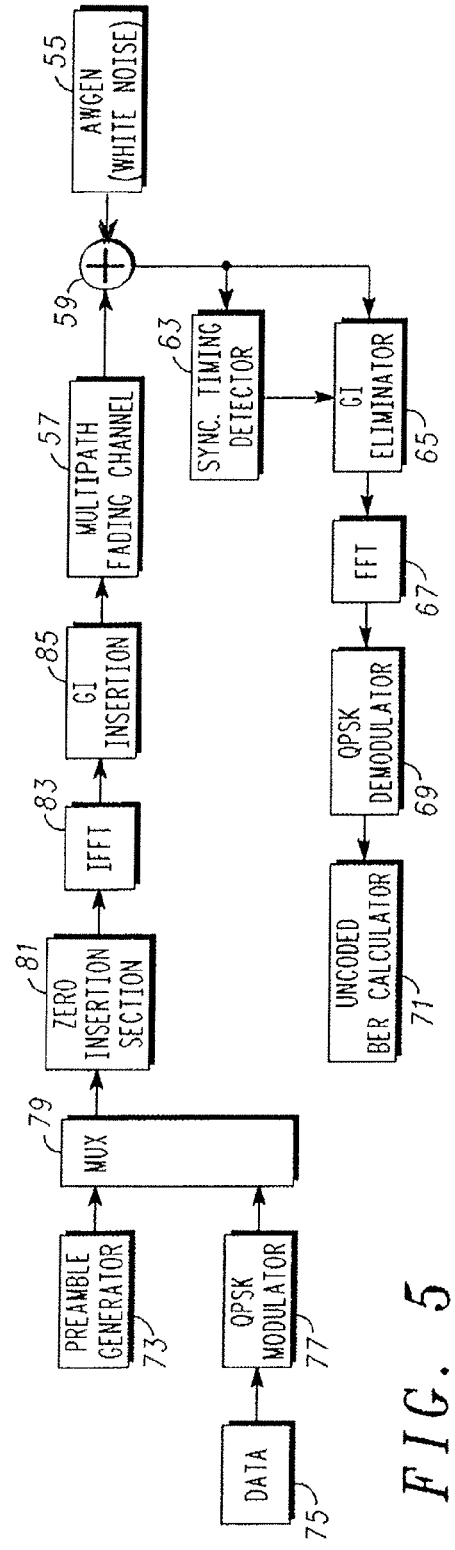
FIG. 5 is a block diagram that illustrates a simulation model for performance evaluation of a prior art communication device.

For comparison between the advantages provided by the present invention and the prior art, the simulation models shown in FIGS. 4 and 5 are evaluated. FIG. 4 shows a simulation model for a communication device that is configured in accordance with the present invention. In the configuration shown in FIG. 4, the configuration of a transmission section is basically the same as that of the transmission section of the communication device shown in FIG. 1. More specifically, the transmission section shown in FIG. 4 comprises a preamble generator 41, an FFT section 43, a zero substitution section 45, a data supplier 47, a QPSK modulator 48, a zero insertion section 49, a time multiplexer 51, an IFFT section 53, and a GI insertion section 55. It should be noted, however, that the QPSK modulator 48 is provided between the data supplier 47 and zero insertion section 49.

A multipath fading channel 57, an adder 59, a white noise (AWGN) generator 51, a synchronization timing detector 63, a GI eliminator 65, an FFT section 67, a QPSK demodulator 69, and an uncoded BER calculator 71 are incorporated to evaluate the signal in the transmitter section shown in FIG. 4.

FIG. 5 shows a simulation model for the prior art. As is the case with the transmitter section shown in FIG. 9, the transmitter section shown in FIG. 5 comprises a preamble generator 73, a data supplier 75, a QPSK modulator 77, a time multiplexer 79, a zero insertion section 81, an IFFT section 83, and a GI insertion section 85. It should be noted that the QPSK modulator 77 is provided between the data supplier 75 and time multiplexer 79. The elements for receiving a signal from the transmitter section described above for evaluation purposes are configured the same as shown in FIG. 4 and designated by the same reference numerals as indicated in FIG. 4.

Figure 9:
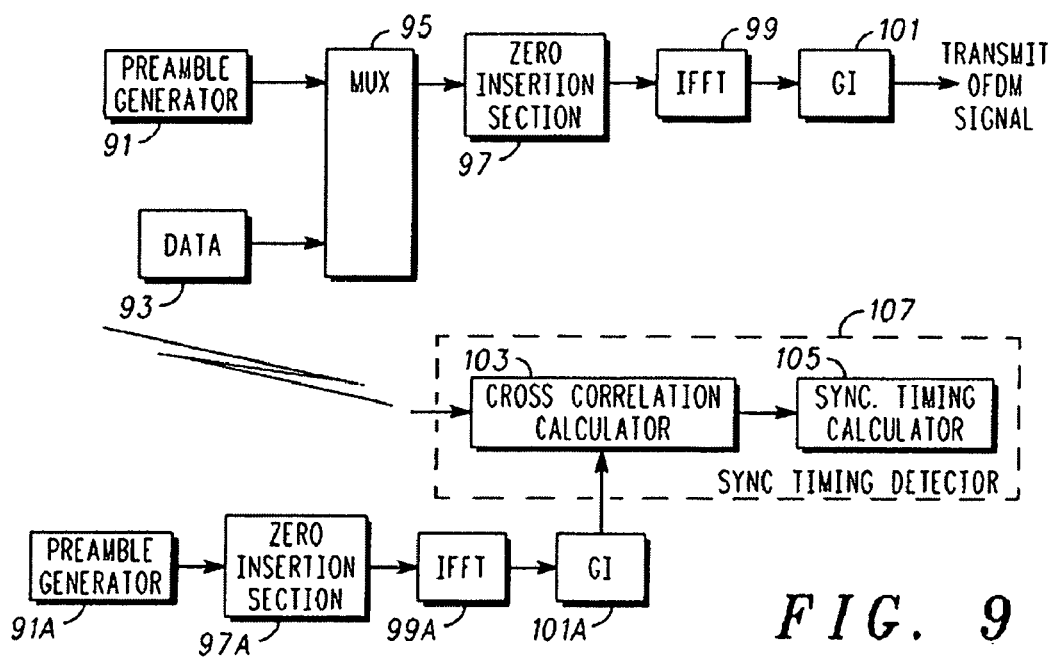
FIG. 9 is a block diagram that schematically shows the configuration of a prior art OFDM communication device.

The synchronization timing detector 63 in FIGS. 4 and 5 is configured the same as the synchronization timing detectors 20, 107, which are shown in FIGS. 1 and 9, respectively. Further, the uncoded information bit error rate (uncoded BER) prevalent when the power for synchronization preamble transmission is attenuated is employed as an evaluation index.

Figures 6, 7A, 7B:
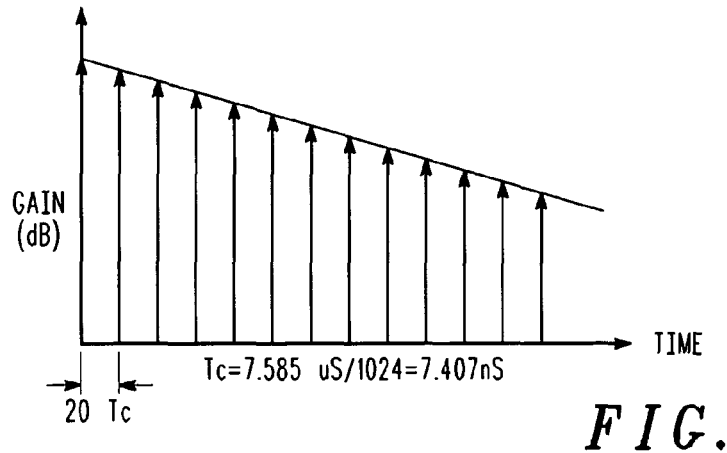
FIG. 6 illustrates the simulation conditions for performance evaluation.
FIGS. 7A and 7B illustrate the characteristics of a multipath fading channel that is used for performance evaluation.

FIGS. 6 and 7 depict simulation conditions. FIG. 6 shows various simulation conditions. In FIG. 6, the term "SCH" denotes a synchronization preamble transmission channel, whereas the term "DTCH" denotes a data transmission channel.

FIGS. 7A and 7B show a channel model of a multipath fading channel. FIG. 7A shows an impulse response waveform of a 12-path type. The "Tc" value indicates a transmit OFDM signal cycle per sample. FIG. 7B shows the delay time and gain of each path.

Figure 8:
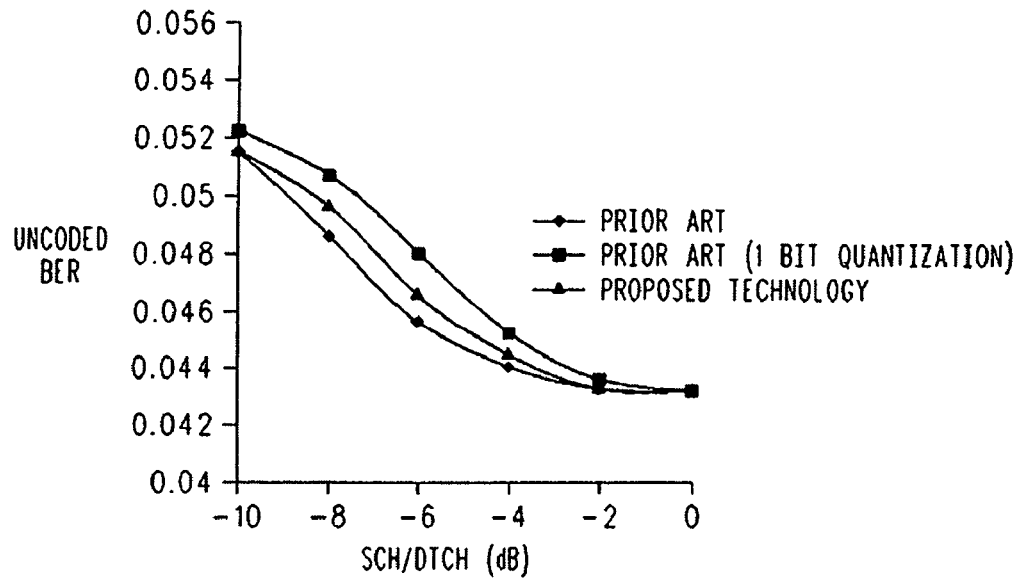
FIG. 8 is a graph that compares the simulation results of the present invention and prior art.

FIG. 8 shows the results of the simulation described above. When the uncoded BER is 0.05, it is obvious from this figure that the power required for synchronization preamble transmission according to the present invention is approximately 1 dB smaller than in the prior art in which the employed synchronization preamble is quantized to one bit. An uncoded BER of 0.05 is equivalent to a BLER (block error rate) of 0.01 when a 1/2 rate Viterbi code is used. In the present invention, a 1-bit type synchronization preamble is used for cross correlation in the receiver section. Therefore, the volume of cross-correlation calculations may be the same as for the prior art 1-bit quantization type.

As a synchronization preamble for symbol synchronization between a transmitter and a receiver in an OFDM communication device, the present invention uses a preamble that has passed through an ideal LPF as described above. It is therefore possible to prevent the characteristics from significantly deteriorating even when the synchronization preamble power is reduced. As a result, excellent communication quality can be maintained even when the synchronization preamble is decreased in order to reduce the calculation time and interference with data.

DESCRIPTION OF THE SYMBOLS

1: Preamble generator
3: FFT section
5: Zero substitution section
7: Data supplier
9: Zero insertion section
10: Synchronization signal generator
11: Time multiplexer
13: IFFT section
15: GI insertion section
17: Preamble signal supplier
19: Cross-correlation calculator
20: Synchronization timing detector
21: Synchronization timing calculator

The invention claimed is:

1. An orthogonal frequency division multiplexing (OFDM) communication device comprising:
   a time multiplexor;
   a synchronization signal generator operatively connected to the time multiplexer; and
   a data supplier operatively connected to the time multiplexor, wherein a zero-amplitude reduced preamble signal, which is obtained by passing a specified synchronization preamble through an ideal low-pass filter in the synchronization signal generator to reduce a signal component to near-zero amplitude within a time domain, is time-multiplexed in the time multiplexor with transmit data received from the data supplier to generate an OFDM transmit signal.

2. The OFDM communication device according to claim 1 wherein said ideal low-pass filter comprises a fast Fourier transform (FFT) section for subjecting an input signal to an FFT and a zero substitution section for providing zero substitution for FFT section output components having a frequency higher than specified.

3. The OFDM communication device according to claim 2 wherein said ideal low-pass filter comprises a table that stores values obtained when input signals pass through said ideal low-pass filter in accordance with values of the input signals.

4. The OFDM communication device according to claim 1 wherein said ideal low-pass filter comprises a table that stores values obtained when input signals pass through said ideal low-pass filter in accordance with values of the input signals.

5. A method for use in an orthogonal frequency division multiplexing (OFDM) communication device for generating and transmitting an OFDM signal, the method comprising:
   generating a zero-amplitude reduced preamble signal having no frequency components higher than a specified pass band;
   generating transmit data;
   multiplexing the preamble signal and the transmit data to generate a multiplexed signal such that the transmit data occupy frequency components that avoid interference from the preamble signal in the multiplexed signal;
   transforming the multiplexed signal by a Inverse Fast Fourier Transform;
   adding a guard interval to the transformed multiplexed signal to form an OFDM signal; and
   transmitting the OFDM signal including the preamble signal and the transmit data.

6. The method of claim 5 wherein the preamble signal is based on a specified synchronization preamble.

7. The method of claim 6 wherein the preamble signal is based on a fast Fourier transform of the specified synchronization preamble.

8. The method of claim 6 wherein the preamble signal is obtained by passing the specified synchronization preamble through an ideal low-pass filter.

9. The method of claim 5 wherein the preamble signal has a reduced amount of near-zero signal component amplitude within a time domain.

10. The method of claim 5 wherein the transmit data occupy frequency components above the specified pass band of the preamble signal.

11. The method of claim 5 wherein the transmit data do not occupy at least the frequency components corresponding to the preamble signal in the multiplexed signal.

12. A method for use in a orthogonal frequency division multiplexing (OFDM) communication device for receiving an OFDM signal, the method comprising:

receiving the OFDM signal including a zero-amplitude reduced preamble signal and a transmit data signal, wherein the preamble signal is based on a first specified synchronization preamble, wherein the preamble signal has no frequency components higher than a specified pass band, and wherein the transmit data occupy frequency components that avoid interference from the preamble signal in the received OFDM signal;

determining a cross correlation between the received OFDM signal and a second specified synchronization preamble; and calculating a synchronization position in accordance with the determined cross correlation.

13. The method of claim 12 wherein the synchronization position is shifted from a peak value position by a specified amount of time.

14. The method of claim 12 wherein the preamble signal is a fast Fourier transform of the first specified synchronization preamble.

15. The method of claim 12 wherein the preamble signal is obtained by passing the first specified synchronization preamble through an ideal low-pass filter.

16. The method of claim 12 wherein the preamble signal has a reduced amount of near-zero signal component amplitude within a time domain.

17. The method of claim 12 wherein the transmit data occupy frequency components above the specified pass band of the preamble signal thereby avoiding interference from the preamble signal in the received OFDM signal.

18. The method of claim 12 wherein the transmit data do not occupy at least the frequency components corresponding to the preamble signal in the received OFDM signal.

* * * * *